Aug. 14, 1934. J. DE LA CIERVA 1,969,781
AIRCRAFT OF THE ROTATIVE SUSTAINING WING TYPE
Filed May 31, 1932 2 Sheets-Sheet 1
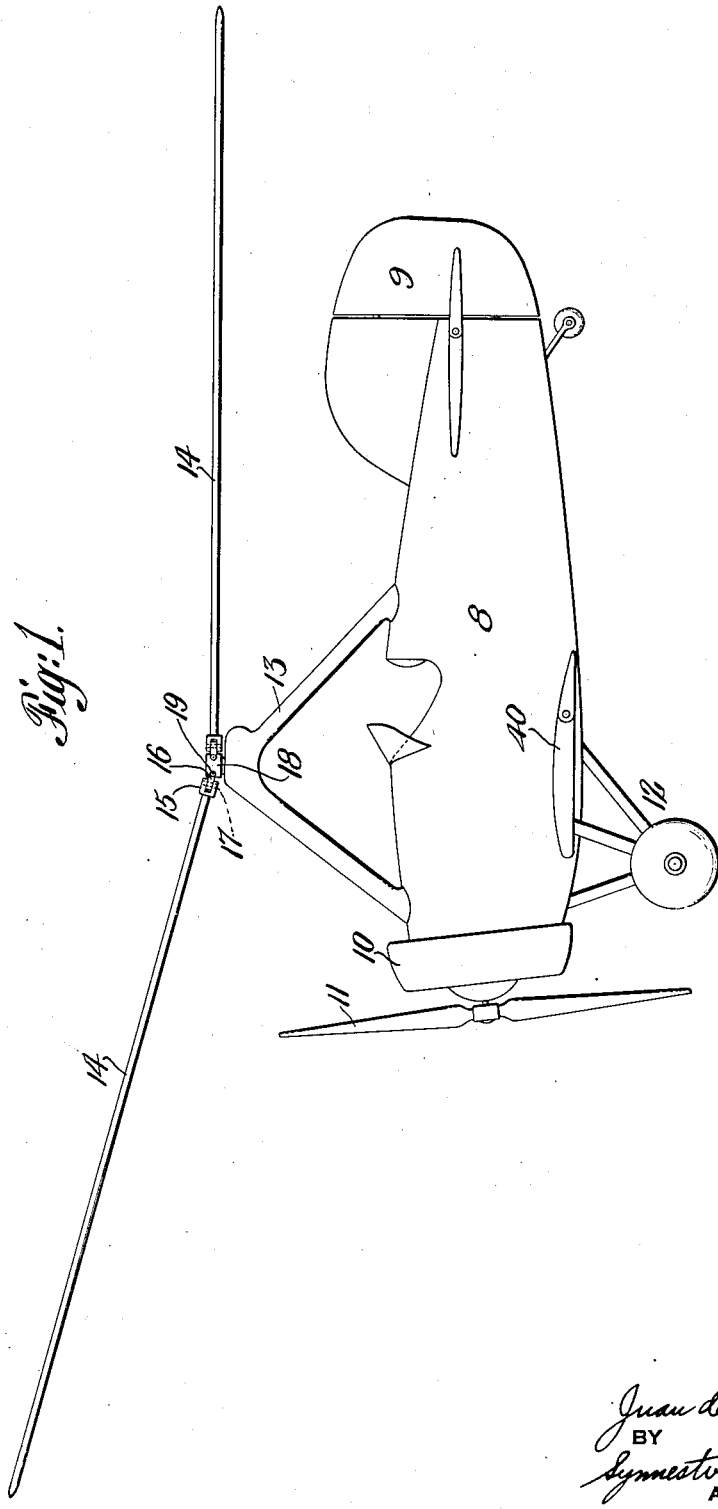
INVENTOR
Juan de la Cierva
BY
Synnestvedt + Lechner
ATTORNEYS

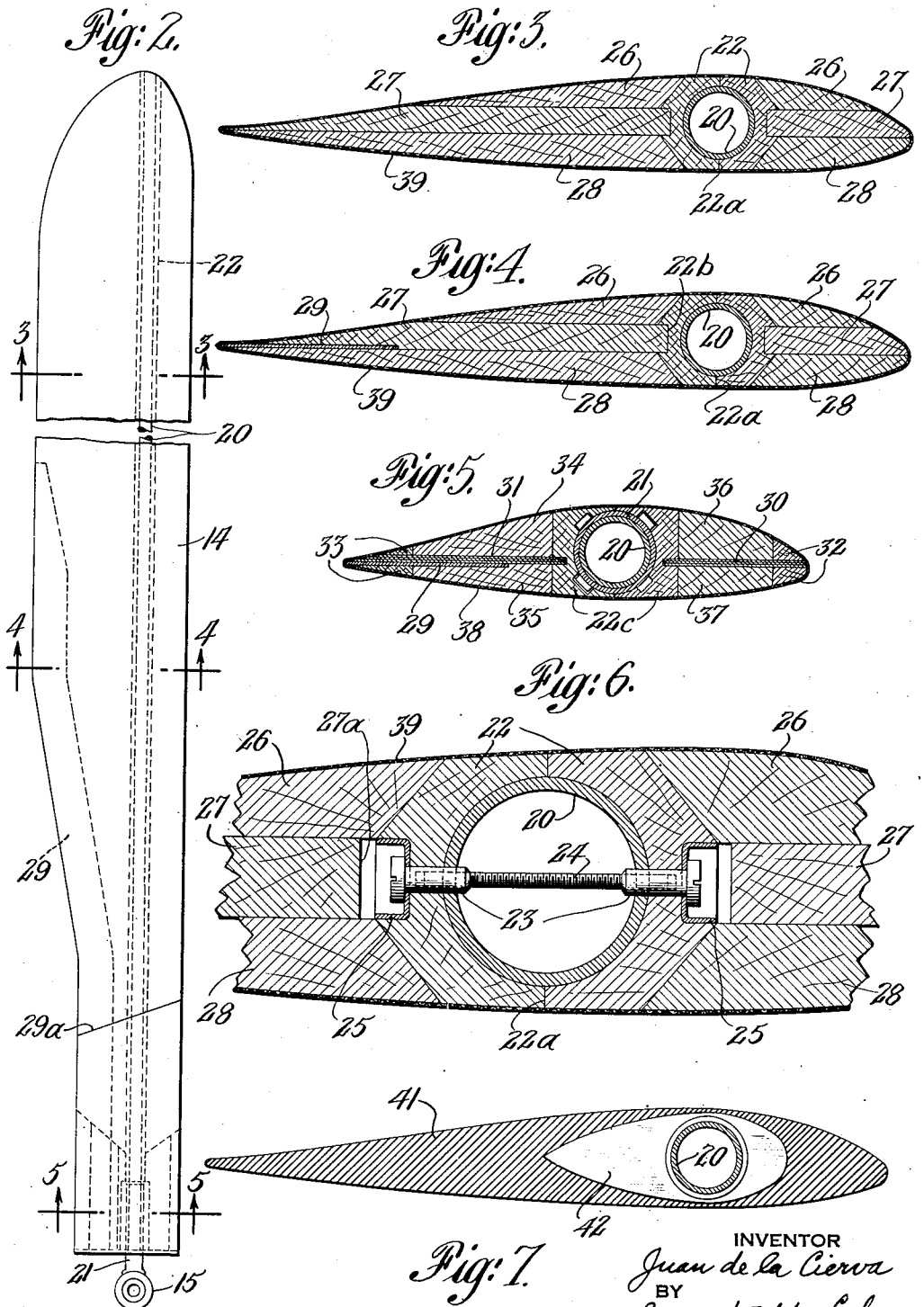

Patented Aug. 14, 1934

1,969,781

UNITED STATES PATENT OFFICE 1,969,781

AIRCRAFT OF THE ROTATIVE SUSTAINING WING TYPE

Juan de la Cierva, Madrid, Spain, assignor to Autogiro Company of America, Philadelphia, Pa., a corporation of Delaware Application May 31, 1932, Serial No. 614,399
In Great Britain June 15, 1931

21 Claims. (Cl. 170—164)

This invention relates to aircraft of the rotative sustaining wing type and is especially concerned with craft of this type in which the sustaining force is derived from a system of freely rotative and air-actuated wings or blades mounted for rotation about a common generally upright axis, the wings preferably being secured to the mounting or axis structure in such manner as to permit movement of the individual wing within as well as generally transversely of the rotative path of travel.

The invention, furthermore, is more particularly concerned with a novel wing construction for a sustaining system of the character just referred to.

Among prior types of rotative wings might be mentioned the construction utilizing a longitudinal spar or spars on which a plurality of closely spaced ribs were mounted, the whole being covered by means of fabric or some other material applied over the ribs to define a blade of airfoil contour.

The present invention has in view obtaining various advantages by the use of a wing or blade of what might be termed substantially "solid" construction, some of the most important objects of the present invention being to reduce the expense of blade manufacture and materially simplify the blade construction. Additionally, the invention has in view the provision of a blade which is relatively light but which, at the same time, has adequate strength to withstand the normal forces, stresses and wear and tear of service.

It might also be noted at this point that the blade structure of the present invention is especially suitable for blades of relatively narrow chord or transverse dimension. The advantage here involved, as compared to the prior practice above referred to, will be apparent from consideration of the fact that very considerable time and work is necessary in building up a spar-and-rib blade. Ordinarily three or four such blades or wings are employed in an autorotative rotor, and the individual wing or blade has in some instances been as much as 25 feet in length. Obviously, the complication of such a structure is not materially reduced in blades of narrow chord, as compared to those of relatively great transverse dimension.

More specifically, this invention contemplates a rotor blade construction for aircraft of the type referred to in which one or more longitudinal strength members or spars are encased in a continuous or substantially "solid" blade structure of light rigid material which is formed to define not only the plan form of the blade but also the transverse profile or contour thereof. The blade thus consists of a practically solid mass of light material which is secured to the longitudinal spar or spars. As examples of the materials which I contemplate employing to form the major portion of the blade, such ultralight materials as balsa wood or expanded rubber might be mentioned. However, it will be understood that other materials may be employed, and further that the body of the blade need not necessarily be entirely filled with the material; it being only necessary that a sufficient volume of the cross sectional dimensions of the blade be infilled, with a sufficiently resistive material, that the blade body be inherently capable of withstanding the various pressure conditions encountered.

The foregoing together with other objects and advantages which may occur to those skilled in the art will be more apparent from a consideration of the followinng description taken in connection with the accompanying drawings, in which—

Figure 1 is a somewhat diagrammatic side view of an aircraft of the type to which this invention relates, the said aircraft being equipped with a sustaining rotor system composed of blades constructed in accordance with this invention;

Figure 2 is a partial plan view of one form of blade constructed in accordance with this invention;

Figures 3, 4 and 5 are transverse sectional views, on an enlarged scale, taken substantially as indicated by the section lines 3—3, 4—4 and 5—5 on Figure 2, respectively;

Figure 6 is a still further enlarged transverse sectional view through a portion of the blade structure illustrating the manner in which certain portions thereof may be built up and secured to each other; and Figure 7 illustrates, in transverse section, a modified blade structure the details of which will be considered hereinafter.

Referring first to Figure 1, it will be seen that the aircraft illustrated includes a fuselage 8 having an empennage 9, engine and propeller 10 and 11, under-carriage 12 and a sustaining rotor system mounted above the body or fuselage 8 as by means of a pylon structure 13. The craft may also be equipped with supplemental fixed lifting surfaces such as indicated at 40 in Figure 1.

The rotor system itself is composed of a plurality of elongated wings or blades 14 (as seen in Fig. 1) each of which has, at its inner end, a forked fitting 15 which is pivotally joined to the block or link 16 by means of a generally upright pivot pin 17. The block 16, in turn, is pivotally mounted on the central rotatable hub 18 by means of a substantially horizontal pivot pin 19.

One suitable general plan form for each blade is indicated in Figure 2, although it will be understood that, in the showing of Figure 2, a mid portion or section of the blade has been broken out, the actual blade shape in plan being, therefore, considerably more elongated. In other words, about two-thirds of the blade length is of the broader chord shown in Figure 2, and of section and pitch such as shown in Figures 3 and 4 (which are cross-sections of Figure 2). Such uniform chord thus extends over a considerable length of the blade, while the root portion may, if desired, be of narrower chord, as shown.

In accordance with the arrangement of Figures 2 to 6 inclusive, the blade is built up on a tubular spar 20, the root of which is fitted into a socket 21 which may conveniently be a steel forging and secured thereto by bolts or the like. This socket 21 may terminate in the forked fitting 15, above referred to, for attachment to the rotor hub.

The spar 20 is encased in a core member 22 of any suitable hard wood such as ash, elm, or the like (or, alternatively, spruce) made in sections of convenient length each section being in two halves for assembling purposes, the joint between the halves being indicated at 22a. The core member is secured to the spar as shown in Figure 6 by means of shanked nuts or ferrules 23 screwed on to short lengths 24 of threaded rod. Channel members or washers 25 are used to distribute the load of the heads of the nuts 23. Securing members 23, 24, 25, of course, are distributed at suitable intervals along the spar.

To the core members 22 are glued balsa or other light wood laminations 26, 27, 28, the core member preferably being grooved at 22b to make a good joint with the middle lamination 27. The latter is cut away as at 27a, where necessary to accommodate the fastening means 23, 24, 25 of the core member. The outer laminations 26, 28 are arranged preferably with their grain running substantially parallel to the spar 20 while the grain of the middle lamination 27 may be arranged transversely to the spar, i. e., from the leading edge to the trailing edge of the blade.

In view of the fact that the main longitudinal loads imposed on the blade by centrifugal force and the bending moments are carried by the longitudinal spar 20, the hard wood blocks, as well as the light wood laminations, may include transverse joints, it being preferable where laminations are employed to stagger the transverse joints of adjacent laminations along the length of the blade.

At the inner or root end of the blade the trailing edge is reinforced by means of a thin sheet 29 of hard wood or other material glued in between the laminations 27 and 28. This is clearly shown in Figures 2, 4 and 5.

The construction close to the root end of the part enclosing the blade socket member 21 is somewhat different and is illustrated in Figure 5. At this point a core member 22c of somewhat modified shape and greater cross section is employed, this preferably being of hard wood or of semi-hard wood such as spruce. This core member is joined by means of webs such as the three-ply strips 30, 31, to shaped blocks of spruce or hard wood 32, 33 forming the leading and trailing edges of the section, the web 31 being also glued to the trailing edge reinforcing member 29. The remainder of the profile at this point is made up with balsa wood blocks 34, 35, 36, 37 and the whole is finished by a skin 38 which may suitably be of three-ply wood forming the outer surface of the blade. This outer skin is preferably of the order of one millimeter in thickness and may be terminated as shown in Figure 2 at 29a.

When balsa wood is employed in the construction of a "solid" blade according to this invention, the blade is preferably shaped to the correct profile after the balsa wood laminations have been glued together and glued to the hard wood core members secured to the spar or spars. The balsa wood parts may however receive a rough preliminary shaping before assembly on the core members.

In order to bind the whole blade together and to give a good surface finish an outer covering of fabric 39 may be applied by gluing or other suitable means, if desired. This may also terminate at the line 29a in abutting relation with respect to the ply wood 38.

Where expanded or porous rubber is employed, I may mould blocks of this material substantially to the proper and final blade profile desired or I may mould substantially the entire blade as a unit, as shown, for example, in Figure 7. Here, again, a main longitudinal spar 20 is employed, but in place of the substantially "solid" balsa wood laminations of the arrangement illustrated in Figures 2 to 6 inclusive, I have substituted a continuous moulded body 41 of relatively light but stiff composition such, for example, as porous or expanded rubber. The spar 20 with flanges 42, spaced at intervals therealong, may be moulded right into the blade. In this way, an extremely simple and yet rugged blade construction is provided, it being noted that the number of parts employed is reduced to a minimum, there being only three major elements in accordance with the arrangement of Figure 7, i. e., the moulded body 41, the blade spar 20, and the stiffening and retaining elements 42.

While, as above brought out, the form of construction of rotor blades herein described is especially suitable for blades of relatively narrow transverse dimension or chord, for example, of about sixteen inches or less, it should be noted that at least some features of the arrangements disclosed are equally applicable to larger blades. In any event, both forms of construction (laminated balsa wood or expanded rubber) result in much simpler and cheaper manufacture than has been possible heretofore with the commonly adopted type of blade construction comprising spaced transverse ribs over which surfacing material is applied. I have found, furthermore, that the weight of a completed "solid" or infilled blade constructed in accordance with this invention, at least in relatively small size blades, need not be any greater than that of a blade of the same size built up of spaced ribs and fabric covering.

Although the constructions of the drawings illustrate blade arrangements in which only a single longitudinal spar or structural element is employed, it should be understood that a similar "solid" blade (either laminated balsa wood or expanded rubber) may be constructed with two or more longitudinal strength members. However, except in the case of relatively large blades, I have found it to be most advantageous, especially on account of the simplicity resulting, to employ only a single longidudinal spar, which is advantageously placed at a thick part of the blade and preferably near the center of pressure and center of gravity, and which thus also serves as the sole means of connection of the blade to its articulation pivots.

It should also be noted that, while I have specifically referred to a moulded blade composed of expanded or porous rubber, other suitable rigid but light rubber composition or other moulding materials might be employed.

From the foregoing it will be apparent that in accordance with this invention, the structure of sustaining rotor blades of the character here involved is very materially simplified. Since sustaining rotor blades of the spar and rib type, as heretofore employed, have involved a major item of expense in the total manufacture of an aircraft of the rotary wing type, the present invention is of very great importance in reducing manufacturing costs, especially of craft employing relatively small size blades or wings.

As contrasted with the fixed wing construction of an airplane, wherein the wing is not subjected to centrifugal force and wherein the air-flow against the wing is normally at right angles to the longitudinal axis of the wing; also as contrasted with propeller construction, including the lifting propeller or air screw of a helicopter, which though subjected to centrifugal force, normally moves axially through the air or at least in a path approximating its line of thrust; and further as contrasted both with rigidly braced fixed wings and rigidly guyed or rigidly driven helicopter lifting screws, it should be understood that the sustaining wing rotor of a machine such as shown in my Figure 1 encounters operating conditions peculiar to such a machine, in which the wings rotate about an upright axis and the machine itself is moved translationally by a forward propelling device. In such a machine, the blades of the rotor are not only subjected to large pressure loads and high degree of centrifugal action, but are also (as seen in Figure 1) subject to oscillative or swinging movement, and further to several other influences foreign to propeller constructions. Such influences might be explained as follows:—

In normal vertical descent, the blades are aerodynamically actuated by the relative air-flow in an upward direction, during which time the air-flow acts substantially symmetrically on all the blades of the rotor, whereas in forward flight, under the influence of the propeller, the rotor is moved through the atmosphere generally edgewise, during which time the air-flow acts unsymmetrically on the several blades of the rotor. Such unsymmetrical action not only involves the difference in air-flow on a blade which is advancing in the direction of the line of flight as compared with a blade which is retreating with respect to the line of flight, but also involves a shifting of the center of pressure longitudinally in and out on each blade as it rotates. In addition, each blade in each cycle of its rotation not only encounters the air at varying angles of attack, but also meets the air-flow at varying angles which angles are the results of the rotation of the blades about their common axis and the edgewise translational movement of the rotor as a whole. Thus the direction of air-flow upon the rotor blades makes various angles from one side to the other of a true perpendicular to the leading edge of a blade viewed in plan. Thus it is normal for the leading edge of a blade, at one point in its rotation, to encounter the air substantially perpendicularly to such leading edge; at another point in its rotation, the relative air-flow will be oblique to the leading edge (viewed in plan); and at another point in its rotation the obliquity will be in the opposite direction.

Under any of these conditions, peculiar to this type of aircraft, the blade of the present invention withstands the stresses very well, even though the blade is of exceedingly simple construction, since the varying pressures at various locations and at different angles are taken by the formed or moulded body material itself, whereas the centrifugal loads are transferred from said material to the longitudinal spar which carries such loads, in tension, substantially along the line of the center of gravity of the blade inwardly to the point of articulation on the hub. Likewise, the torsional loads on the wing or blade, due to its lifting reaction under aerodynamic actuation, are carried by said spar through its pivotal connection to the hub. Furthermore, since there is no sectional sagging of the blade contour, as has heretofore been encountered between the ribs of built up blade constructions, a substantially smooth or uniform airfoil section is presented to the air-flow, when such flow is oblique to the blade as well as when it is perpendicular thereto, and at all normal oscillative positions or angles of the blade on its pivotal mounting.

I claim:—

1. For aircraft, an elongated rotative sustaining wing of substantially "solid" body construction having a primary strengthening structure extended lengthwise therethrough to take the stresses of centrifugal force in rotation and so positioned and constructed as to carry the torsional loads about the longitudinal axis of the wing imposed on said body in flight.

2. For aircraft, an elongated rotative sustaining wing of substantially "solid" body construction having a primary strengthening structure extended lengthwise therethrough to take the stresses of centrifugal force in rotation, said structure having freely pivotal wing mounting means disposed at the inner end thereof.

3. For aircraft, an elongated rotative sustaining wing including main longitudinal spar means having mounting means for the wing arranged at its inner end, and a substantially "solid" airfoil wing structure, of approximately uniform cross-sectional form through an extended portion of its length, built up around the spar means and secured thereto as against dislodgment under the influence of centrifugal force incident to rotation.

4. For an air-actuated rotor, a wing or blade of airfoil shape having a body portion of approximately constant contour over an extended length and of substantially infilled section formed of material capable of maintaining the wing contour as against the air pressures encountered, and a longitudinal tension member to which said body is secured and formed of a material capable of withstanding the centrifugal load imposed upon itself and the body material during rotation.

5. For an air-actuated rotor having an upright hub, a wing or blade of airfoil shape having a body of substantially infilled section formed of material capable of maintaining the blade contour as against the air pressures encountered, a longitudinal tension member formed of a material capable of withstanding the centrifugal load imposed upon itself and the body material during rotation, pivot means for securing to the hub the root end of the wing by connection only to said tension member, and means spaced at intervals along said tension member for securing the body thereto.

6. An air-actuated rotor, including a wing or blade so mounted and positioned as to be subject in each cycle of its rotation to encountering airflow through a range of angles in the general plane of the blade as well as subject to varying aero-dynamic angles of attack, said blade having its body for the most part infilled with shape-retaining material, externally formed over an extended length to an approximately uniform airfoil contour, whereby at any given air-flow angle, through the range of angles encountered, a substantially smooth or uniform airfoil shape is presented.

7. An air-actuated rotor, including a wing or blade so mounted and positioned as to be subject in each cycle of its rotation to encountering airflow through a range of angles in the general plane of the blade as well as subject to varying aero-dynamic angles of attack, said blade having its body for the most part infilled with shape-retaining material, externally formed over an extended length to an approximately uniform airfoil contour, whereby at any given air-flow angle, through the range of angles encountered, a substantially smooth or uniform airfoil shape is presented, the body of the blade being further provided with a main longitudinal tension member acting to carry the centrifugal forces of rotation of the blade.

8. An air-actuated rotor, including a wing or blade so mounted and positioned as to be subject in each cycle of its rotation to encountering airflow through a range of angles in the general plane of the blade as well as subject to varying aero-dynamic angles of attack, said blade having its body for the most part infilled with shape-retaining material, externally former over an extended length to an approximately uniform airfoil contour, whereby at any given air-flow angle, through the range of angles encountered, a substantially smooth or uniform airfoil shape is presented, the body of the blade being further provided with a main longitudinal tension member acting to carry the centrifugal forces of rotation of the blade and positioned with respect to the cross section of the blade near to the center of gravity and the center of pressure thereof.

9. For aircraft, an elongated rotative sustaining wing having a major portion of the cross section thereof formed of wood laminations and having a structural element extended lengthwise therethrough, the laminated portion being secured to said element as against dislodgment under the influence of the centrifugal force of rotation, and a thin exterior covering of a uniform external contour over an extended length of the wing and serving also as a means of binding the wing together.

10. For aircraft, an elongated rotative sustaining wing having a major portion of the cross section thereof formed of wood laminations and having a structural element extended lengthwise therethrough, the laminated portion being secured only to said element as against dislodgment under the influence of centrifugal force incident to rotation.

11. For aircrcaft, a rotative sustaining wing of airfoil shape including metallic spar means extended longitudinally of the wing, a hard wood blade core surrounding and secured to the spar means, and a light wood laminated wing portion shaped to define at least a portion of the airfoil contour of the wing.

12. For aircraft, a rotative sustaining wing of airfoil shape including metallic spar means extended longitudinally of the wing, a hard wood blade core surrounding the spar means, and a light wood laminated wing portion shaped to define at least a portion of the airfoil contour of the wing, said core being secured to the spar means and the laminated portion being glued to the core.

13. For aircraft, a rotative sustaining wing of airfoil shape including metallic spar means extended longitudinally of the wing, a hard wood wing core surrounding and secured to the spar means, and a light wood laminated wing portion secured to and cooperating with said core to define the wing surface contour.

14. For aircraft, a rotative sustaining wing comprising material moulded to define a wing of substantially uniform airfoil contour over an extended portion of its length, spar means extended through the moulded material lengthwise of the wing, and means for retaining the molded material on the spar means as against dislodgment under the influence of centrifugal force of rotation.

15. For aircraft, an elongated rotative sustaining wing comprising porous rubber moulded to define a wing section of airfoil contour.

16. For aircraft, a rotative sustaining wing including main longitudinal spar means having mounting means for the wing arranged at its inner end and a rubber wing structure secured to the spar and shaped to define a wing section of airfoil contour and of approximately uniform pitch through an extended portion of the length of the wing.

17. For an aircraft of the rotative sustaining wing type, a normally aerodynamically actuated rotor having a wing connected at its root end to the axis of rotation, said wing being of very long, narrow plan form and the main portion thereof being of substantially solid material or infilled body formed exteriorly to an airfoil shape of substantially uniform chord throughout a large portion of the wing's length.

18. For an aircraft of the rotative sustaining wing type, a normally aerodynamically actuated rotor having a wing connected at its root end to the axis of rotation, said wing being of very long, narrow plan form and the main portion thereof being of substantially solid material or infilled body formed exteriorly to an airfoil shape of substantially uniform cross-sectional contour throughout a large portion of the wing's length.

19. For an aircraft of the rotative sustaining wing type, a normally aerodynamically actuated rotor having a wing connected at its root end to the axis of rotation, said wing being of very long, narrow plan form and the main portion thereof being of substantially solid material or infilled body formed exteriorly to an airfoil shape of substantially uniform built-in pitch throughout a large portion of the wing's length.

20. In an aircraft with a means of forward propulsion, a sustaining system comprising an upright freely rotative axis structure, a plurality of elongated wings radially extending therefrom and positioned at such incidence as to be aerodynamically rotated thereabout under the influence of relative air-flow in flight, each such wing being of moulded material formed to an air-foil shape, and for each wing a single main spar of hollow tubular construction extending longitudinally therein and located approximately at the thickest part of the chord, means securing the moulded material on the spar as against shift of pitch thereabout and as against centrifugal dislodgment, and means comprising for each spar an individual freely pivotal joint connecting its root end to said axis structure for free and independent swinging of the wing in a plane containing the spar but constructed to restrain the same as against bodily change in pitch about its longitudinal axis.

21. In an aircraft with a means of forward propulsion, a sustaining system comprising an upright freely rotative axis structure, a plurality of elongated wings radially extending therefrom and positioned at such incidence as to be aerodynamically rotated thereabout under the influence of relative air-flow in flight, each such wing being of substantially solid or infilled body made of air-pressure-resistant material externally formed to an airfoil shape of approximately uniform cross-section over an extended portion of the wing, and for each wing a single metallic main spar of hollow tubular construction extending longitudinally therein and located approximately at the thickest part of the chord, means securing the material on the spar as against shift of pitch thereabout and as against centrifugal dislodgment, and means comprising for each spar an individual freely pivotal joint device comprising two pivot axes set at right angles to each other and to the spar and connecting its root end to said axis structure for free and independent swinging of the wing in a plurality of planes containing the spar but constructed to restrain the same as against bodily change in pitch about its longitudinal axis.

JUAN DE LA CIERVA.